United States Patent
Kamm et al.

(10) Patent No.: US 7,597,646 B2
(45) Date of Patent: Oct. 6, 2009

(54) MULTI-SPEED TRANSMISSION

(75) Inventors: Michael Kamm, Bodnegg (DE); Gabor Diosi, Friedrichshafen (DE); Josef Haupt, Tettnang (DE); Gerhard Gumpoltsberger, Friedrichshafen (DE); Peter Ziemer, Tettnang (DE); Martin Brehmer, Constance (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 331 days.

(21) Appl. No.: 11/729,907

(22) Filed: Mar. 29, 2007

(65) Prior Publication Data

US 2007/0232439 A1 Oct. 4, 2007

(30) Foreign Application Priority Data

Mar. 30, 2006 (DE) .................... 10 2006 014 754

(51) Int. Cl.
*F16H 3/62* (2006.01)

(52) U.S. Cl. ...................... 475/277; 475/282
(58) Field of Classification Search ................ 475/277, 475/282, 288, 319
See application file for complete search history.

(56) References Cited

U.S. PATENT DOCUMENTS

| | | | |
|---|---|---|---|
| 6,176,803 B1 | 1/2001 | Meyer et al. | |
| 6,634,980 B1 | 10/2003 | Ziemer | |
| 6,824,492 B2 * | 11/2004 | Tabata et al. | 475/276 |
| 6,960,149 B2 | 11/2005 | Ziemer | |
| 7,014,589 B2 | 3/2006 | Stevenson | |
| 7,018,319 B2 | 3/2006 | Ziemer | |
| 7,377,872 B2 * | 5/2008 | Jang | 475/275 |
| 2006/0052210 A1 * | 3/2006 | Park | 475/275 |
| 2006/0166779 A1 * | 7/2006 | Klemen | 475/280 |
| 2006/0270516 A1 * | 11/2006 | Klemen | 475/280 |

FOREIGN PATENT DOCUMENTS

| | | |
|---|---|---|
| DE | 42 34 572 A1 | 4/1994 |
| DE | 199 49 507 A1 | 4/2001 |
| DE | 100 83 202 T1 | 1/2002 |
| DE | 10 2004 029 952 A1 | 1/2005 |
| DE | 10 2005 002 337 A1 | 8/2006 |
| DE | 100 2005 032 001 A1 | 2/2007 |

* cited by examiner

*Primary Examiner*—Sherry L Estremsky
*Assistant Examiner*—Erin D Bishop
(74) *Attorney, Agent, or Firm*—Davis & Bujold, P.L.L.C.

(57) ABSTRACT

The transmission has an input and output shaft, planetary gearsets, rotatable shafts, and shifting elements. A carrier of the gearset (RS4) and the input shaft are coupled to form the shaft (1). A ring gear of the gearset (RS2), a carrier of the gearset (RS3), and the output shaft are coupled to form a shaft (2). A sun gear of the gearset (RS1) and a sun gear of the gearset (RS4) are coupled to form shaft (3). A ring gear of the gearset (RS1) forms the shaft (4). A sun gear of the gearset (RS3) and a carrier of the gearset (RS2) are coupled to form the shaft (5). A carrier of the gearset (RS1) and a ring gear of the gearset (RS3) are coupled to form the shaft (6). A ring gear of the gearset (RS4) forms the shaft (7). A sun gear of the gearset (RS2) forms the shaft (8).

32 Claims, 2 Drawing Sheets

Fig. 1

| Gear | Engaged Shifting Elements | | | | | Ratio i | Step φ |
|---|---|---|---|---|---|---|---|
| | Brake | | Clutch | | | | |
| | A | B | C | D | E | | |
| 1 | ● | ● | ● | | | 4.40 | |
| 2 | ● | ● | | | ● | 3.21 | 1.37 |
| 3 | | ● | ● | | ● | 2.23 | 1.44 |
| 4 | | ● | | ● | ● | 1.68 | 1.33 |
| 5 | | ● | ● | ● | | 1.28 | 1.31 |
| 6 | | | ● | ● | ● | 1.00 | 1.28 |
| 7 | ● | | ● | ● | | 0.88 | 1.14 |
| 8 | ● | | | ● | ● | 0.73 | 1.20 |
| R | ● | ● | | ● | | -3.24 | TOTAL 6.03 |

Fig. 2

MULTI-SPEED TRANSMISSION

This application claims priority from German Application Serial No. 10 2006 014 754.5 filed Mar. 30, 2006.

FIELD OF THE INVENTION

The present invention concerns a multi-speed transmission of planetary construction, especially an automatic transmission for a motor vehicle, including an input shaft, an output shaft, four planetary gearsets, at least eight rotary shafts, as well as five shifting elements whose selective engagement produces various reduction ratios between the input shaft and the output shaft, so that eight forward gears and at least one reverse gear can be realized.

BACKGROUND OF THE INVENTION

Automatic transmissions, especially for motor vehicles, comprise, according to the state of the art, planetary gearsets which are shifted using friction or shifting elements, such as clutches and brakes, and are usually connected to a starting element subjected to a slip effect and are selectively provided with a lockup clutch, such as a hydrodynamic torque converter or a fluid clutch.

In DE 101 15 983 A1 of the applicant is described, by way of example, a multi-speed transmission comprising an input shaft, which is connected to a front-mounted gearset, an output shaft, which is connected to a rear-mounted gearset, and at least seven shifting elements whose selective shifting allows at least seven forward gears to be shifted without a range shift. The front-mounted gearset consists of one shiftable or non-shiftable planetary gearset or at least two non-shiftable mutually coupled planetary gearsets. The rear-mounted set is configured as a two-carrier, four-shaft transmission with two shiftable planetary gearset, and has four free shafts. The first of the free shafts this two-carrier, four-shaft transmission is connected to the first shifting element, the second free shaft is connected to the second and third shifting elements, the third free shaft is connected to the fourth and fifth shifting elements, and the fourth free shaft is connected to the output shaft. For a multi-speed transmission with a total of six shifting elements, it is proposed, according to the invention, to connect the third free shaft or the first free shaft of the rear-mounted gearset additionally with a sixth shifting element. For a multi-speed transmission with a total of seven shifting elements, it is proposed according to the invention to connect the third free shaft or the first free shaft of the rear-mounted set in addition to a sixth shifting element, and to connect the first free shaft in addition to a seventh shifting element.

Several other multi-speed transmissions are known, for example, from DE 101 15 995 A1 by the Applicant, in which four shiftable mutually coupled planetary gearsets and six or seven friction-locking shifting elements are provided, whose selective engagement allows a rotational speed of an input shaft to be transmitted to an output shaft of the transmission, in such a way that nine or eleven forward gears and at least one reverse gear can be provided. Two or three shifting elements are engaged in each gear according to the schematic diagram, while during a change from one gear to the respectively following higher or lower gear, only one engaged shifting element is disengaged in order to prevent range shifting and a previously not engaged shifting element is provided.

In the related unpublished patent application DE 10 2005 002 337.1 of the applicant is furthermore proposed a multi-speed transmission with an input shaft, an output shaft, four mutually coupled separate planetary gearsets and five shifting elements, in which eight forward gears can be shifted without range shifting, that is, in such a way that during a change form a forward gear into the following higher or lower forward gear, respectively only one of the previously engaged shifting elements is disengaged and only one previously disengaged gears is engaged. The multi-speed transmission has also a reverse gear. Three shifting elements are respectively engaged in all forward gears and in the reverse gear. With regard to a kinematic coupling of the four planetary gearsets among each another and to the input shaft and output shaft, it is provided that a carrier of the fourth planetary gearset and the input shaft are connected to each other and form a first shaft of the transmission, a carrier of the third planetary gearset and the output shaft are connected to each other and form a second shaft of the transmission, a sun gear of the first planetary gearset and a sun gear of the fourth planetary gearset are connected to each other and form a third shaft of the transmission, a ring gear of the planetary gearset forms a fourth shaft of the transmission, a ring gear of the second planetary gearset and a ring gear of the third planetary gearset are connected to each other and form a fifth shaft of the transmission, a carrier of the first planetary gearset and a ring gear of the third planetary gearset are connected to each other and form a sixth shaft of the transmission, a sun gear of the second planetary gearset and a ring gear of the fourth planetary gearset are connected to each other and form a seventh shaft of the transmission, and a carrier of the second planetary gearset forms an eighth shaft of the transmission. With regard to the kinematic coupling of the five shifting elements to the four planetary sets and to the input shaft and output shaft, it is provided that the first shifting element is arranged within the direction of power flow between the third shaft and a housing of the transmission, the second shifting element is arranged between the fourth shaft and the housing of the transmission, the third element is arranged between the first and fifth shaft, the fourth shifting element is arranged either between the eighth and second shaft or between the eighth and the sixth shaft, and the fifth shifting element is arranged either between the seventh and fifth shaft or between the seventh and eighth shaft or between the fifth and eighth shaft.

Automatically shiftable motor vehicle transmissions of planetary construction have already been frequently described in the state of the art and are being constantly further developed and improved. These transmissions should thus have a sufficient number of forward gears as well as a reverse gear with a transmission ratio with a high overall spread that is well suited for motor vehicles as well as very advantageous progressive ratios. These should furthermore make possible a high startup transmission ratio in the forward direction and include a direct gear as well as be suitable for use in passenger cars as well as in commercial vehicles. These transmissions should furthermore require a low construction expenditure, In particular a small number of shifting elements, and prevent double shifting in sequential shifting mode, so that only one shifting element is changed during shifting into defined gear groups.

It is an object of the invention to propose a multi-speed transmission of the type mentioned above with at least eight shiftable forward gears without range shifting and at least one reverse gear, the lowest possible number of shifting elements is required when utilizing a total of four planetary gearsets. The transmission should, in addition, have a large ratio spread with comparatively harmonious gear gradation and an advantageous efficiency at least in the main travel gears at least, that is, comparatively low drag and gearing losses.

SUMMARY OF THE INVENTION

The multi-speed transmission of planetary construction according to the invention is based on the schematic diagram of the related patent application DE 10 2005 002 337.1 of the Applicant and has an input shaft, an output shaft, four mutually coupled planetary gearsets, at least eight rotary shafts, as well as five shifting elements (two brakes and three clutches), whose selective engagement produces various reduction ratios between the input shaft and the output shaft, so that eight forward and one reverse gear can be realized. Three of the five shifting elements are engaged at all times in each gear, while during a change from a forward gear into the next following higher and lower forward gear, respectively only one of the previously engaged shifting elements is disengaged and only one of the previously disengaged shifting elements is engaged.

It is proposed, according to the invention, that:
- a carrier of the fourth planetary gearset and the input shaft are permanently connected to each other and form the first shaft of the transmission;
- a ring gear of the second planetary gearset and a carrier of the third planetary gearset and the output shaft are permanently connected to each other and form the second shaft of the transmission;
- a sun gear of the first planetary gearset and a sun gear of the fourth planetary gearset are permanently connected to each other and form the third shaft of the transmission;
- a ring gear of the first planetary gearset forms the fourth shaft of the transmission;
- a sun gear of the third planetary gearset and a carrier of the second planetary gearset are permanently connected to each other and form the fifth shaft of the transmission;
- a carrier of the first planetary gearset and a ring gear of the third planetary gearset are permanently connected to each other and form the sixth shaft of the transmission;
- a ring gear of the fourth planetary gearset forms the seventh shaft of the transmission;
- a sun gear of the second planetary gearset forms the eighth shaft of the transmission;
- the first shifting element is arranged in the direction of power flow between the third shaft and a housing of the transmission,
- the second shifting element is arranged in the direction of power flow between the fourth shaft and the housing of the transmission;
- the third shifting element is arranged in the direction of power flow between the first and fifth shaft of the transmission;
- the fourth shifting element is arranged in the direction of power flow between the seventh and eighth shaft of the transmission, and
- the fifth shifting element is arranged in the direction of power flow between the fifth and seventh shaft of the transmission.

The multi-speed transmission of the invention differs from the related multi-speed transmission disclosed in DE 10 2005 002 337.1 in that the second shaft of the transmission is henceforth also permanently connected to the ring gear of the secondary planetary gearset, the sun gear of the third planetary gearset and the carrier of the second planetary gearset are henceforth permanently connected to each other as a fifth shaft, the seventh shaft of the transmission is henceforth only formed by the ring gear of the fourth planetary gearset, the sun gear of the second planetary gearset forms henceforth the eighth shaft of the transmission, and the fourth shifting element is arranged in the direction of power flow between the seventh and eighth shaft of the transmission.

As with the representative multi-speed transmission disclosed in DE 10 2005 002 337.1, it also applies with respect to the multi-speed transmission that the first forward gear is achieved by engaging the first, second and third shifting element, the second forward gear is achieved by engaging the first, second and fifth shifting element, the third forward gear is achieved by engaging the second, third and fifth shifting element, the fourth forward gear is achieved by engaging the second, fourth and fifth shifting element, the fifth forward gear is achieved by engaging second, third and fourth shifting element, the sixth forward gear is achieved by engaging the third, fourth and fifth shifting element, the seventh forward gear is achieved by engaging the first, third and fourth shifting element, the eighth forward gear is achieved by engaging the first, fourth and fifth shifting element, and the reverse gear is achieved by engaging the first, second and fourth shifting element.

Three of the four planetary gearsets are constructed as so-called negative planetary gearsets, whose respective planetary gears mesh with the sun gear and ring gear of the respective planetary gearset. One of the four planetary gearsets (specifically the second planetary gearset) is constructed as a so-called positive planetary gearset with inner and outer planetary gears meshing with one another, wherein these inner planetary gearsets also mesh with the sun gear of this positive planetary gearset, and these outer planetary gearsets also mesh with the ring gear of this plus planetary gearset. With regard to the spatial arrangement of the four planetary gearsets in the housing of the transmission, it is proposed in an advantageous embodiment to arrange the four planetary gearsets co-axially alongside one another in a sequential order of "first, fourth, second, third planetary gearset".

The spatial arrangement of the shifting elements of the multi-speed transmission of the invention within their transmission housing is basically restricted only by the dimensions and the outer configuration of the transmission housing. Numerous suggestions with regard to the spatial arrangement and constructional configuration of the shifting elements can be inferred, for example, from the related patent application DE 10 2005 002 337.1.

This it can be provided by way of example in an embodiment, which is advantageous for a standard drive with regard to the shifting element arrangement wherein the first and the second shifting elements are arranged from a spatial perspective at least partially in a region radially above the first or fourth planetary gearset, and the third, fourth and fifth shifting element are, from a spatial perspective, at least partially arranged in a region axially between the fourth and second planetary gearset. For example, the third shifting element is herein axially directly adjacent to the fourth planetary gearset, while the fifth shifting element, especially its disk set is axially directly adjacent to the second planetary gearset, wherein the fourth shifting element is arranged from a spatial perspective at least partially is an region axially between the third shifting element and the disk packet of the fifth shifting element.

Gear ratios with a great overall spread in harmonic gear gradation suited for passenger cars are obtained especially by means of the embodiment of the multi-speed transmission of the invention. The construction expense is furthermore comparatively low with the multi-speed transmission of the invention due to a small number in shifting elements, namely two brakes and three clutches. A good efficiency is obtained, on the one hand, with the multi-speed transmission according to the invention as a consequence of the low drag losses, since only two shifting elements are disengaged in each gear, and on the other hand, as a consequence of the low gearing losses in the simply designed individual planetary gearsets.

In addition to this, it is also advantageously possible with the multi-speed transmission of the invention to carry out a startup with a hydrodynamic converter, an external starting clutch, or also with other suitable external starting elements. It is also conceivable to make possible the startup process with an engagement element incorporated into the transmission. One of the two brakes actuated in the first and second forward gear and in the reverse gear is preferably suitable for this purpose.

The multi-speed transmission of the invention is moreover designed in such a way that adaptability to various power train configurations within the power flow direction, as well as in a spatial aspect, are made possible. Hence, it is possible to arrange the drive and output of the transmission selectively co-axially or axially parallel to each other without special constructional measures.

For an application with input shaft and output shaft running co-axially with reference to each other, it is appropriate, for example, that the first planetary gearset is the planetary gearset of the planetary gearset group according to the invention, which faces the drive of the transmission. Depending on the spatial arrangement of the five shifting elements inside the transmission housing, it can moreover be provided that all four planetary gearsets are advantageously centrally passed through in axial direction, in each case, at most by one shaft of the transmission. Hence, the first and fourth planetary gearsets are centrally passed through only by the first shaft of the transmission in axial direction in connection with a shifting element arrangement in which the four planetary gearsets are arranged side by side co-axially in relation to each other in the sequential order of "first, fourth, second, third planetary gearset", the first and second shifting gearsets are arranged near the drive in the region radially above the first or fourth planetary gearset, and in which the third, fourth and fifth are at least partially arranged in a region axially between the fourth and second planetary gearset, while the second planetary gearset is only centrally passed through by the fifth shaft of the transmission in an axial direction, and there is no need for the third planetary gearset to be passed through centrally in an axial direction by a shaft of the transmission. The constructional configuration of pressure and lubricant supply to the servo facilities of the individual shifting elements is correspondingly simple.

For an application with input shaft and output shaft running axially parallel or at an angle with reference to each other, the first or the third planetary gearset can be arranged on the side of the transmission housing, which faces the drive motor that is operatively connected to the input shaft. If the first planetary gearset faces the drive of the transmission, then it can be provided (as with a co-axial arrangement of input shaft and output shaft, according to the spatial arrangement of the five shifting elements inside the transmission housing) that all four planetary gearsets are respectively passed through at most by one shaft of the transmission centrally in the axial direction: the first and fourth planetary gearset is only passed through by the first shaft of the transmission, and the second planetary gearset only passed through by the fifth shaft of the transmission.

In contrast, in the third planetary gearset faces the drive of the transmission in connection with a drive and an output that are not arranged co-axially with respect to each other, the first and fourth planetary gearset does not need to be centrally passed through in axial direction by a shaft of the transmission. In connection with the above mentioned arrangement of the third, fourth and fifth shifting element axially between the second and fourth planetary gearset, for example, the second planetary gearset is passed through centrally in axial direction by the fifth shaft of the transmission as well as by the first shaft of the transmission that runs in some sections centrally inside this fifth shaft, while the third planetary gearset is only passed through centrally by the first shaft.

In all cases, the third shaft of the transmission, which is formed in some sections by the sun gears of the first and fourth planetary set, is pivoted on a hub fixed on the transmission housing. If the first planetary gearset faces the drive of the transmission, this aforementioned housing-mounted hub is a component of the drive-side transmission housing wall, or otherwise a component of the housing wall opposite the drive motor.

BRIEF DESCRIPTION OF THE DRAWINGS

The invention will now be described, by way of example, with reference to the accompanying drawings. Identical or comparable components are here provided with identical reference numerals wherein.

DETAILED DESCRIPTION OF THE INVENTION

Figure 1:
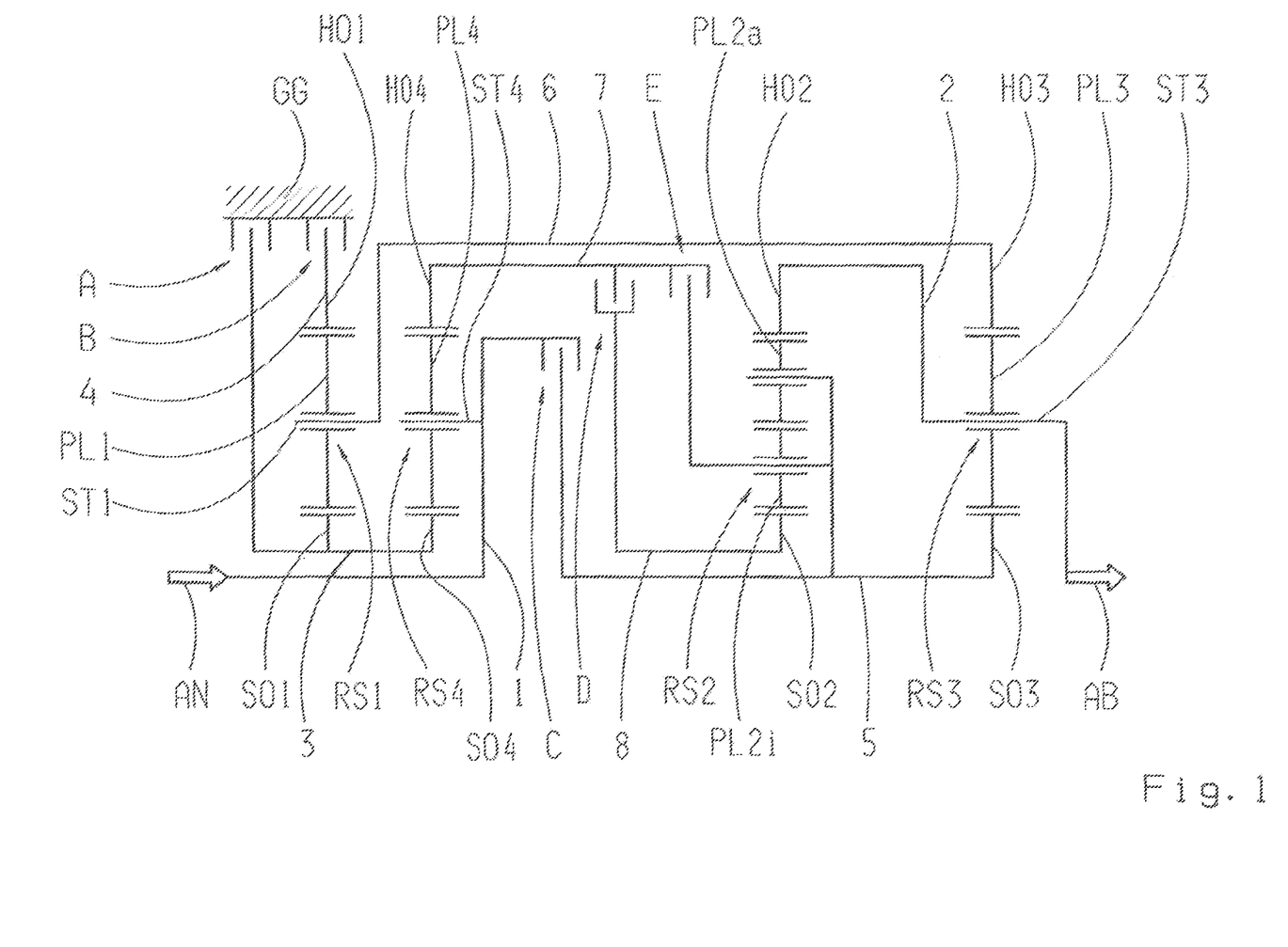
FIG. 1 shows a schematic representation of an embodiment of a multi-speed transmission according to the invention.

FIG. 1 illustrates an embodiment for a multi-speed transmission of the invention in schematic representation. The transmission includes an input shaft AN and an output shaft AB as well as four planetary gearsets RS1, RS2, RS3, RS4 and five shifting elements A, B, C, D, E, which are all arranged in a housing GG of the transmission. The four planetary gearsets RS1, RS2, RS3 RS4 are arranged in this embodiment co-axially one behind the other in the sequential order of "RS1, RS4, RS2, RS3" in the axial direction. The planetary gearsets RS1, RS3 and RS4 are configured as negative planetary gearsets. A negative planetary gearset, as is well known, has planetary gears that mesh with sun gear and ring gear of this planetary gearset. The ring gears of the planetary gearsets RS1, RS3, RS4 are identified with HO1, HO3 and HO4, the sun gears are identified with SO1, SO3, and SO4, the planetary gears are identified with PL1, PL3 and PL4, and the carriers, on which the aforementioned planetary gears are rotatably mounted, are identified with ST1, ST3 and ST4. The planetary gearset RS2 is configured as a simple positive planetary gearset in double planetary construction. A positive planetary gearset has, as is well known, inner and outer planetary gears that mesh with one another, whereby these inner planetary gears also mesh with the sun gear of this planetary gearset, and wherein these outer planetary gears also mesh with the ring gears of this planetary gearset. The ring gear of this planetary gearset RS2 is identified with HO2, the sun gear is identified with SO2, the inner planetary gears are identified with PL2$i$, the outer planetary gears are identified with PL2$a$, and the carrier, on which the inner and outer planetary gears PL2$i$, PL2$a$ are rotatably mounted, are identified with ST2. The shifting elements A and B are configured as brakes, which in the represented embodiment are both executed as form-locking shiftable disk brakes, obviously in another configuration also as friction-locking shiftable belt brakes, or, for example, also as form-locking shiftable claw or cone brakes. A selective shifting of eight forward gears and at least one reverse gear is realized with these five shifting elements A to E. The multi-speed transmission of the invention has a total of at least eight rotatable shafts, which are identified with 1 to 8.

The following is provided with regard to the kinematic coupling of the individual elements of the four planetary gearsets RS1, RS2, RS3, RS4 among one anther and to the input shaft and the output shaft AN, AB: The carrier ST4 of the fourth planetary gearset RS4 and the input shaft AN are permanently connected to each other and form the shaft 1. The ring gear HO2 of the planetary gearset RS2, the carrier ST3 of the third planetary gearset RS3, and the output shaft AB are permanently connected to each other and form the shaft 2. The sun gears SO1, SO4 of the first and fourth planetary gearset RS1, RS4 are permanently connected to each other and form the shaft 3. The ring gear HO1 of the first planetary gear RS1 forms the shaft 4. The sun gear SO3 of the third planetary gearset RS3 and the coupled carrier ST2 of the secondary planetary gearset RS2 are permanently connected to each other and form the shaft 5. The carrier ST1 of the first planetary gearset RS1 and the ring gear HO3 of the third planetary gearset RS3 are permanently connected to each other and form the shaft 6. The ring gear HO4 of the fourth planetary gearset RS4 forms the shaft 7. The sun gear SO2 of the secondary planetary gearset RS2 forms the shaft 8.

The following is provided with regard to the kinematic coupling of the five shifting elements A to E to the shafts 1 to 8 of the transmission described in this way in connection with the multi-speed transmission according to FIG. 1: The brake A as first shifting element is arranged in the direction of power flow between the shaft 3 and a housing GG of the transmission. The brake B as a second shifting element is arranged in the direction of power flow between the shaft 4 and a housing GG. The clutch C as third shifting element is arranged in the direction of power flow between the shaft 1 and the shaft 5. The clutch D as fourth shifting element is arranged in the direction of power flow between the shaft 7 and the shaft 8. The clutch E as fifth shifting element is arranged in the direction of power flow between the shaft 5 and the shaft 7.

In the embodiment shown in FIG. 1, the first planetary gearset RS1 is the transmission gear positioned near the input of the transmission and the third planetary gearset RS3 is the transmission gear positioned near the output, wherein the input shaft AN and the output shaft AB are arranged co-axially with respect to each other by way of example. It is obvious to the person skilled in the art that this transmission can be modified without particular expenditure, so that the input shaft and the output shaft are no longer arranged co-axially with respect to each other, but are arranged, for example, axially parallel or at an angle with respect to each other. With an arrangement of this type, the person skilled in the art will also be able to arrange the drive of the transmission near the third planetary gearset RS3, if necessary, thus on the side of the third planetary gearset RS3 facing away from the first planetary gearset RS1.

The spatial arrangement of the shifting elements of the embodiment of a multi-speed transmission of the invention shown in FIG. 1 can be selected arbitrarily within the transmission and is restricted only by the dimensions and the outer configuration of the transmission housing GG.

In the embodiment shown in FIG. 1, the two brakes A, B are arranged, from a spatial perspective, in the region of the first planetary gearset RS1, near to the input, wherein the kinematic interfacing of the two brakes A, B on the first planetary gearset RS1 implies that the brake B is nearer the fourth planetary gearset RS4 adjacent to the first planetary gearset RS1 than the brake A or that the brake A is arranged nearer the drive of the transmission than the brake B. From a spatial perspective, the brake B is at least partially arranged in a region radially above the first planetary gearset RS1, and the brake A is correspondingly arranged on the side of the first planetary gearset RS1 (near the input) facing away from the fourth planetary gearset RS4. An inner disk carrier of the brake A comprises a section of the shaft 3 of the transmission and is rotationally fixed on the side of the first planetary gearset RS1 facing away from the fourth planetary gearset RS4 with its sun gear SO1. Sections of the shaft 3 are configured as a type of sun shaft, which connects the sun gears SO1, SO4 of planetary gearsets RS1, RS4 to each other. In this connection, the shaft 3 can be pivoted on the input shaft AN as well as on a hub near the transmission housing (not depicted in greater detail in FIG. 1). An inner disk carrier of the brake B is rotationally fixed as the shaft 4 of the transmission to ring gear HO1 of the first planetary gearset RS1. The servo devices necessary for the activation of both brakes A, B are not depicted in greater detail in FIG. 1 for the sake of simplicity and can be incorporated, for example, into the transmission housing GG or a housing cover on the transmission housing, or can also be axially displaceably mounted.

The person skilled in the art will modify this exemplary spatial arrangement of the two brakes A, B as needed without particular inventive effort. Hence, the brake A can also be arranged, for example, at least partially radially above the first planetary gearset RS1 and the brake B can be arranged at least partially radially above the fourth planetary gearset RS4. In still another embodiment, both brakes A, B can by way of example also be arranged radially above each other axially bordering on the first planetary gearset RS1 on its side facing away from the fourth planetary gearset RS4, wherein the brake B is then arranged, for example, over a larger diameter than the brake A.

As is furthermore apparent from FIG. 1, all three clutches C, D, E are located, from a spatial perspective, at least partially in a region axially between the fourth and the second planetary gearset RS4, RS2, wherein the servo devices that are necessary for actuating the respective disk set of the clutches C, D, E are not depicted in greater detail for the sake of simplicity.

The clutch C borders axially directly on the fourth planetary gearset RS4. Here, an outer disk carrier of the clutch C forms a section of the shaft 1 of the transmission and is rotationally fixed on the side of the disk set of the clutch C facing the fourth planetary gearset RS4 with the carrier ST4 of the fourth planetary gearset RS4 and with the input shaft AN. An inner disk carrier of the clutch C comprises a section of the shaft 5 of the transmission and is rotationally fixed, on the one hand, to the side of the second planetary gearset RS2 facing the third planetary gearset RS3 with the carrier of this planetary gearset RS2 and, on the other hand, also to the sun gear SO3 of the third planetary gearset RS3. The servo device necessary for the actuation of the disk set of the clutch C can be arranged, for example, inside the cylinder chamber, which is formed by the outer disk carrier of the clutch C. It can be axially displaceably mounted on this outer disk carrier of the clutch C and then rotates permanently with the rotational speed of the shaft 1 or the input shaft. In order to equalize the rotary pressure of the rotating pressure chamber of this servo device, the clutch C can be provided in a known manner with a dynamic pressure compensation.

As is further apparent from FIG. 1, the clutch E (at least, the disk set the clutch E) is directly adjacent to the second planetary gearset RS2. Moreover, an inner disk carrier of the clutch E constitutes a section of the shaft 5 of the transmission and is rotationally fixed to the side of the second planetary gearset RS2 facing the fourth planetary gearset RS4 with its carrier ST2. An outer disk carrier of the clutch E constitutes a section of the shaft 7 of the transmission and is rotationally fixed to ring gear HO4 of the fourth planetary gearset RS4. Here, the shaft 7 completely overlaps the clutch C in its axial course. The servo device necessary for actuation of the disk set of the clutch E can be arranged, by way of example, inside the cylinder chamber which is formed by the outer disk carrier of the clutch E. It can be axially displaceably mounted on the outer disk carrier of the clutch E and can then be permanently rotated with the rotational speed of the shaft 7. In order to equalize the rotary pressure of the rotating pressure chamber of this servo device, the clutch E can be provided in a known manner with a dynamic pressure compensation.

As is furthermore apparent from FIG. 1, from a spatial perspective, at least the disk carrier of the clutch D is arranged in a region that is axially between the disk set of the clutch C and the disk set of the clutch E. An inner disk carrier of the clutch D comprises a section of the shaft 8 of the transmission and is rotationally fixed to the sun gear SO2 of the second planetary gear set RS2. An outer disk carrier of the clutch D comprises a section of the shaft 7 of the transmission and is torque-proof connected (just like the outer disk carrier of the clutch E) to the ring gear HO4 of the fourth planetary gearset RS4. In this way, a common disk carrier can be provided for the clutches D, E in a manner that is advantageous for production engineering. The servo device necessary for the actuation of the disk set of the clutch D can be axially displaceably mounted, for example, on the inner disk carrier of the clutch D and rotates then permanently at the rotational speed of the shaft 8. The servo device of the clutch D can also be axially displaceably mounted, however, on the outer disk carrier of the clutch D and rotates in this case permanently at the rotational speed of the shaft 7. Just like the clutches C and E, the clutch D can also have a dynamic pressure compensation.

In accordance with the gearset diagram corresponding to the sequential order of "RS1, RS4, RS2, RS3" of the four planetary gearsets RS1, RS2, RS3, RS4 and in harmony with the arrangement of the three clutches C, D, E in a region axially between the second planetary gearset RS2 and the first or fourth planetary gearset RS1 and RS4, the shaft 6 of the transmission completely overlaps in an axial direction over its course the fourth planetary gearset RS4, the three clutches C, D, E, as well as the second planetary gearset RS2 completely.

Let it be expressly pointed out that the above described arrangement of the three clutches C, D, E is only to be viewed as an example. If need be, the person skilled in the art will also modify this exemplary spatial arrangement of the three clutches C, D, E. Numerous suggestions for this can be derived, for example, from the related patent application DE 10 2005 002 337.1. Hence, for example, it can be provided that the disk set of clutch D (without basically altering the component structure of the transmission represented in FIG. 1), when viewed spatially, is arranged at least partially radially above the disk set of the clutch C, thus, from a spatial perspective, the clutch D is arranged at least partially radially over the clutch C.

Figure 2:
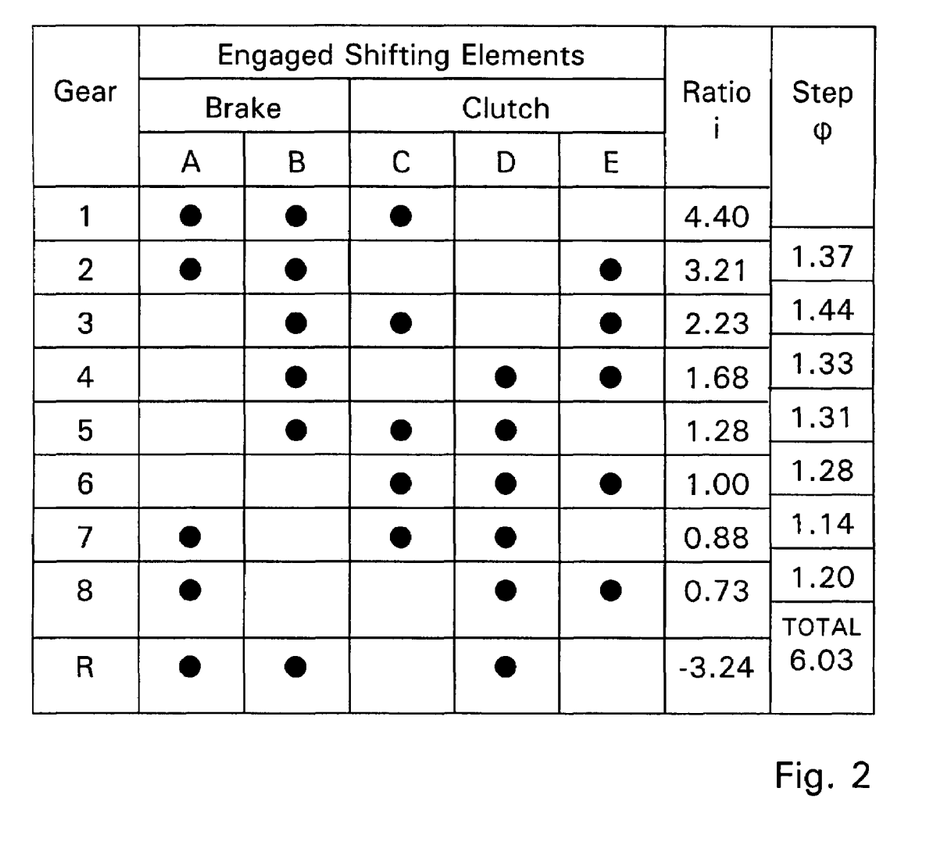
FIG. 2 shows an exemplary schematic diagram of the multi-speed transmission according to FIG. 1.

The schematic diagram of the multi-speed transmission of the invention according to FIG. 1 is depicted in FIG. 2. Three shifting elements and two shifting elements are engaged in each gear. In addition to the shifting logic, exemplary values of the respective gear ratios $\phi$ of the individual gears and the shift ranges to be determined based thereon can also be derived from the schematic diagram. The indicated gear ratios i result from the (typical) stationary transmission gear ratios of the four planetary gearsets RS1, RS2, RS3, RS4 of minus 2.50, plus 2.60, minus 3.40, and minus 2.70. It can furthermore be inferred from the schematic diagram that double shifting or range shifts can be prevented with the sequential shifting, since two gears that are adjacent in the shifting logic use two shifting elements. The sixth gear is configured as a direct gear.

The first forward gear is achieved by engaging the brakes A and B and the clutch C, the second forward gear is achieved by engaging the brakes A and B and the clutch E, the third forward gear is achieved by engaging the brake B and the clutches C and E, the fourth forward gear is achieved by engaging the brake B and the clutches D and E, the fifth forward gear is achieved by engaging the brake B and the clutches C and D, the sixth forward gear is achieved by engaging the clutches C, D and E, the seventh forward gear is achieved by engaging the brake A and the clutches C and D, and also the eighth forward gear is achieved by engaging the brake A and the clutches D and E. As it is further apparent from the shifting diagram, the reverse gear is achieved by engaging the brakes A and B and the clutch D.

According to the invention, an initial movement of the motor vehicle is possible with a shifting element incorporated into the transmission. In this connection, a shifting element, which is needed in the first forward gear as well as in reverse gear, thus here preferably the brake A or the brake B, is especially suitable. These two brakes A, B are advantageously also required in the second forward gear. If the brake B is used as a starting element incorporated into the transmission, even starting the first five forward gears and the reverse gear is therewith possible. As is apparent from the schematic diagram, the clutch C can also be used to start in the forward direction and the clutch D can be used as an internal transmission element to start in the reverse direction.

The following moreover applies to the previously represented or described embodiment for a multi-speed transmission of the invention:

Different gear progressions can also be achieved according to the invention with the same transmission diagram, depending on the shifting logic, so that a variation specifically adapted to the application and/or vehicle is made possible.

It is moreover possible to provide additional free gearings at any suitable place in the multi-speed transmission, for example between a shaft and the housing or if need be to connect two shafts.

An axle differential and/or a distributor differential can be arranged on the input side or on the output side.

Within the framework of an advantageous further development, the input shaft AN can be separated by a coupling element of a drive engine, if needed, wherein a hydrodynamic converter, a hydraulic clutch, a dry start up clutch, a wet starting clutch, a magnetic powder clutch, or a centrifugal clutch can be used as such a driving element. It is also possible to arrange a starting element of this type in the direction of the power flow behind the transmission, wherein in this case, the input shaft AN is permanently connected to the crankshaft of the drive engine.

The multi-speed transmission of the invention moreover makes possible the arrangement of a torsion vibration damper between the drive engine and the transmission.

Within the scope of a further embodiment of the invention, a wear-free brake, such as, for example, a hydraulic or an electric retarder or the like can be arranged on each shaft, preferably on the input shaft AN or on the output shaft AB, which is of particular significance for the use in commercial motor vehicles. An auxiliary drive can be provided on any shaft, in addition, in order to drive additional units on each shaft, preferably on the input shaft AN or the output shaft AB.

The used shifting elements can be configured as load-shifting clutches or brakes. Non-positive clutches or brakes, such as, for example, disk clutches, band brakes and/or cone clutches, can be used. Moreover, positive brakes and/or clutches, such as, for example, synchronizing mechanisms or claw clutches, can also be used as shifting elements.

Another advantage of the multi-speed transmission presented herein is that an electric machine can be mounted as a generator and/or as an additional drive engine on each shaft.

Any embodiment configuration, in particular any spatial arrangement of the planetary sets and the shifting elements per se as well as with respect to each other, is understood to be covered under the protective scope of the claims, as long as it is practical from the technical point of view and does not influence the function of the transmission as disclosed in the claims, even if these embodiments are not explicitly depicted in the Figures or described in the disclosure.

REFERENCE NUMERALS 1 first shaft
2 second shaft
3 third shaft
4 fourth shaft
5 fifth shaft
6 sixth shaft
7 seventh shaft
8 eighth shaft
A first shifting element, first brake
B second shifting element, second brake
C third shifting element, first clutch
D fourth shifting element, second clutch
E fifth shifting element, third clutch
AB output shaft
AN input shaft
GG housing
RS1 first planetary gearset
HO1 ring gear of the first planetary gearset
SO1 sun gear of the first planetary gearset
ST1 carrier of the first planetary gearset
PL1 planetary gears of the first planetary gearset
RS2 second planetary gearset
HO2 ring gear of the second planetary gearset
SO2 sun gear of the second planetary gearset
ST2 carrier of the second planetary gearset
PL2a outer planetary gears of the second planetary gearset
PL2i inner planetary gears of the second planetary gearset
RS3 third planetary gearset
HO3 ring gear of the third planetary gearset
SO3 sun gear of the third planetary gearset
ST3 carrier of the third planetary gearset
PL3 planetary gears of the third planetary gearset
RS4 fourth planetary gearset
HO4 ring gear of the fourth planetary gearset
SO4 sun gear of the fourth planetary gearset
ST4 carrier of the fourth planetary gearset
PL4 planetary gears of the fourth planetary gearset
i gear ratio
φ progression ratio

The invention claimed is:

1. A multi-speed automatic transmission of a planetary construction for a motor vehicle, comprising
an input shaft (AN),
an output shaft (AB),
first, second, third and fourth planetary gearsets (RS1, RS2, RS3, RS4) with each of the planetary gearsets having a carrier, a sun gear and a ring gear, at least first, second, third, fourth, fifth, sixth, seventh and eighth rotatable shafts (1, 2, 3, 4, 5, 6, 7, 8), and first, second, third, fourth, and fifth shifting elements (A, B, C, D, E), whose selective engagement create different gear ratios between the input shaft (AN) and the output shaft (AB) to implement at least a reverse gear, and first, second, third, fourth, fifth, sixth, seventh and eighth forward gears;
the carrier (ST4) of the fourth planetary gearset (RS4) and the input shaft (AN) are coupled with one another to form the first shaft (1);
the ring gear (HO2) of the second planetary gearset (RS2), the carrier (ST3) of the third planetary gearset (RS3) and the output shaft (AB) are coupled with one another to form the second shaft (2);
the sun gear (SO1) of the first planetary gearset (RS1) and the sun gear (S04) of the fourth planetary gearset (RS4) are coupled with one another to form the third shaft (3);
the ring gear (HO1) of the first planetary gearset (RS1) forms the fourth shaft (4);
the sun gear (S03) of the third planetary gearset (RS3) and the carrier (ST2) of the second planetary gearset (RS2) are coupled with one another to form the fifth shaft (5);
the carrier (ST1) of the first planetary gearset (RS1) and the ring gear (HO3) of the third planetary gearset (RS3) are coupled with one another to form the sixth shaft (6);
the ring gear (HO4) of the fourth planetary gearset (RS4) forms the seventh shaft (7);
the sun gear (SO2) of the second planetary gearset (RS2) forms the eighth shaft (8);
the first shifting element (A) being located between the third shaft (3) and a transmission housing (GG);
the second shifting element (B) being located between the fourth shaft (4) and the transmission housing (GG);
the third shifting element (C) being located, in a direction of power flow, between the first shaft (1) and the fifth shaft (5);
the fifth shifting element (E) being located, in the direction of power flow, between the seventh shaft (7) and the fifth shaft (5); and
the fourth shifting element (D) being located, in the direction of power flow, between the seventh shaft (7) and the eighth shaft (8).

2. The multi-speed transmission according to claim 1, wherein
the first forward gear results from engagement of the first, the second and the third shifting elements (A, B, C);
the second forward gear results from engagement of the first, the second and the fifth shifting elements (A, B, E);
the third forward gear results from engagement of the second, the third and the fifth shifting elements (B, C, F);
the fourth forward gear results from engagement of the second, the fourth and the fifth shifting elements (B, D, E);
the fifth forward gear results from engagement of the second, the third and the fourth shifting elements (B, C, D);
the sixth forward gear results from engagement of the third, the fourth and the fifth engaging elements (C, D, E);
the seventh forward gear results from engagement of the first, the third and the fourth engaging elements (A, C, D);
the eighth forward gear results from engagement of the first, the fourth and the fifth engaging elements (A, D, E); and the reverse gear results from engagement of the first, the second and the fourth shifting elements (A, B, D).

3. The multi-speed transmission according to claim 1, wherein the first, the third and the fourth planetary gearsets (RS1, RS3, RS4) are negative planetary gearsets and the second planetary gearset (RS2) is a positive planetary gearset.

4. The multi-speed transmission according to claim 1, wherein the first, the second, the third and the fourth planetary gearsets (RS1, RS2, RS3 RS4) are co-axially arranged, in the direction of power flow, in a sequential order of: the first planetary gearset (RS1), the fourth planetary gearset (RS4), the second planetary gearset (RS2) and the third planetary gearset (RS3).

5. The multi-speed transmission according to claim 1, wherein the input shaft (AN) is one of axially parallel and at an angle to the output shaft (AR), and one of the first planetary gearset (RS1) and the third planetary gearset (RS3) is located on a side of the transmission housing (GG) facing a drive motor which communicates with the input shaft (AN).

6. The multi-speed transmission according to claim 1, wherein the input shaft (AN) is coaxial with the output shaft (AR), the first planetary gearset (RS1) is located on a side of the transmission housing (GG) facing a drive motor which communicates with the input shaft (AN).

7. The multi-speed transmission according to claim 1, wherein the first, the second, the third and the fourth planetary gearsets (RS1, RS2, RS3, RS4) are passed, respectively, in an axial direction through by no more than one of the first, the second, the third, the fourth, the fifth, the sixth, the seventh and the eighth rotatable shafts (1, 2, 3, 4, 5, 6, 7, 8).

8. The multi-speed transmission according to claim 1, wherein the first planetary gearset (RS1) and the fourth planetary gearset (RS4) are passed through, in an axial direction, by only the first shaft (1), and the second planetary gearset (RS2) is passed through, in the axial direction, by only the fifth shaft (5).

9. The multi-speed transmission according to claim 1, wherein at least one of the first planetary gearset (RS1) and the fourth planetary gearset (RS4) are not passed through, in an axial direction, by one or more of the first, the second, the third, the fourth, the fifth, the sixth, the seventh and the eighth rotatable shafts (1, 2, 3, 4, 5, 6, 7, 8), the second planetary gearset (RS2) is passed through, in the axial direction, by the fifth shaft (5) and the first shaft (1), the first shaft (1) passes centrally through the fifth shaft (5), and only the first shaft (1) passes centrally through the third planetary gearset (RS3) in the axial direction.

10. The multi-speed transmission according to claim 1, wherein the third shaft (3) detachably communicates with a hub fixed to the transmission housing (GG).

11. The multi-speed transmission according to claim 1, wherein at least one of the first shifting element (A) and the second shifting element (B) is located at least partially radially above one of the first planetary gearset (RS1) and the fourth planetary gearset (RS4).

12. The multi-speed transmission according to claim 1, wherein the first shifting element (A) is axially located adjacent the second shifting element (B), and at least one friction element of the second shifting element (B) is located closer to the fourth planetary gearset (RS4) than a friction element of the first shifting element (A).

13. The multi-speed transmission according to claim 1, wherein one of the first shifting element (A) is at least partially radially located over the second shifting element (B) and the second shifting element (B) is at least radially partially located over the first shifting element (A).

14. The multi-speed transmission according to claim 1, wherein the third shifting element (C) is at least partially axially located between the fourth planetary gearset (RS4) and the second planetary gearset (RS4, RS2).

15. The multi-speed transmission according to claim 1, wherein the third shifting element (C) is axially directly adjacent the fourth planetary gearset (RS4).

16. The multi-speed transmission according to claim 1, wherein the fifth shifting element (E) is located at least partially axially between the fourth planetary gearset (RS4) and the second planetary gearset (RS2).

17. The multi-speed transmission according to claim 1, wherein a disk carrier of the fifth shifting element (E) is axially directly adjacent the second planetary gearset (RS2).

18. The multi-speed transmission according to claim 1, wherein the fourth shifting element (D) is located at least partially axially between the fourth planetary gearset (RS4) and the second planetary gearset (RS2).

19. The multi-speed transmission according to claim 1, wherein the fourth shifting element (D) is located at least partially axially between the third shifting element (C) and the fifth shifting element (F).

20. The multi-speed transmission according to claim 1, wherein a disk carrier of the fourth shifting element (D) is located at least partially radially over a disk carrier of the third shifting element (C).

21. The multi-speed transmission according to claim 1, wherein the fourth and the fifth shifting elements (D, E) share a common disk carrier which is coupled with the ring gear (HO4) of the fourth planetary gearset (RS4).

22. The multi-speed transmission according to claim 1, wherein the sixth shaft (6) completely surrounds, in an axial direction, at least the third, the fourth and the fifth shifting elements (C, D, E) and the secondary planetary gearset (RS2).

23. The multi-speed transmission according to claim 1, wherein at least one free wheel is located between the housing (GG) and at least one of the input, the output, the first, the second, the third, the fourth, the fifth, the sixth, the seventh and the eighth shafts (AN, AB, 1, 2, 3, 4, 5, 6, 7, 8).

24. The multi-speed transmission according to claim 1, wherein the input shaft (AN) and the output shaft (AB) are located on opposite sides of the housing (GG).

25. The multi-speed transmission according to claim 1, wherein the input shaft (AN) and the output shaft (AB) are located on a common side of the housing (GG).

26. The multi-speed transmission according to claim 1, wherein at least one of an axle differential and a distributor differential is located on at least one of the input shaft (AN) and the output shaft (AB).

27. The multi-speed transmission according to claim 1, wherein a coupling element is located, in the power flow direction, between a drive motor and the input shaft (AN).

28. The multi-speed transmission according to claim 27, wherein the coupling element is one of a hydrodynamic converter, a hydraulic clutch, a dry start up clutch, a wet start up clutch, a magnetic powder clutch and a centrifugal force clutch.

29. The multi-speed transmission according to claim 1, wherein at least one of the first, the second, the third and the fourth shifting elements (A, B, C, D) initiates drive of the vehicle, and the input shaft (AN) is rotationally fixed to a crankshaft of a drive motor.

30. The multi-speed transmission according to claim 29, wherein one of the first shifting element (A) and the second shifting element (B) initiates drive of the vehicle in one of a forward direction and a reverse direction.

31. The multi-speed transmission according to claim 1, wherein one of a wear-free brake and an auxiliary drive is located on one of the input, the output, the first, the second, the third, the fourth, the fifth, the sixth, the seventh and the eighth shafts (AN, AB, 1, 2, 3, 4, 5, 6, 7, 8) for driving one of an additional unit, an electric motor and a generator.

32. The multi-speed transmission according to claim 1, wherein the first, the second, the third, the fourth and the fifth shifting elements (A, B, C, D, E) are one of a friction-locking clutch, a friction-locking brake, a disk clutch, a belt brake, a cone clutch, a form-locking clutch, a form-locking brake, a cone clutch and a claw clutch.

* * * * *